Figure 1:
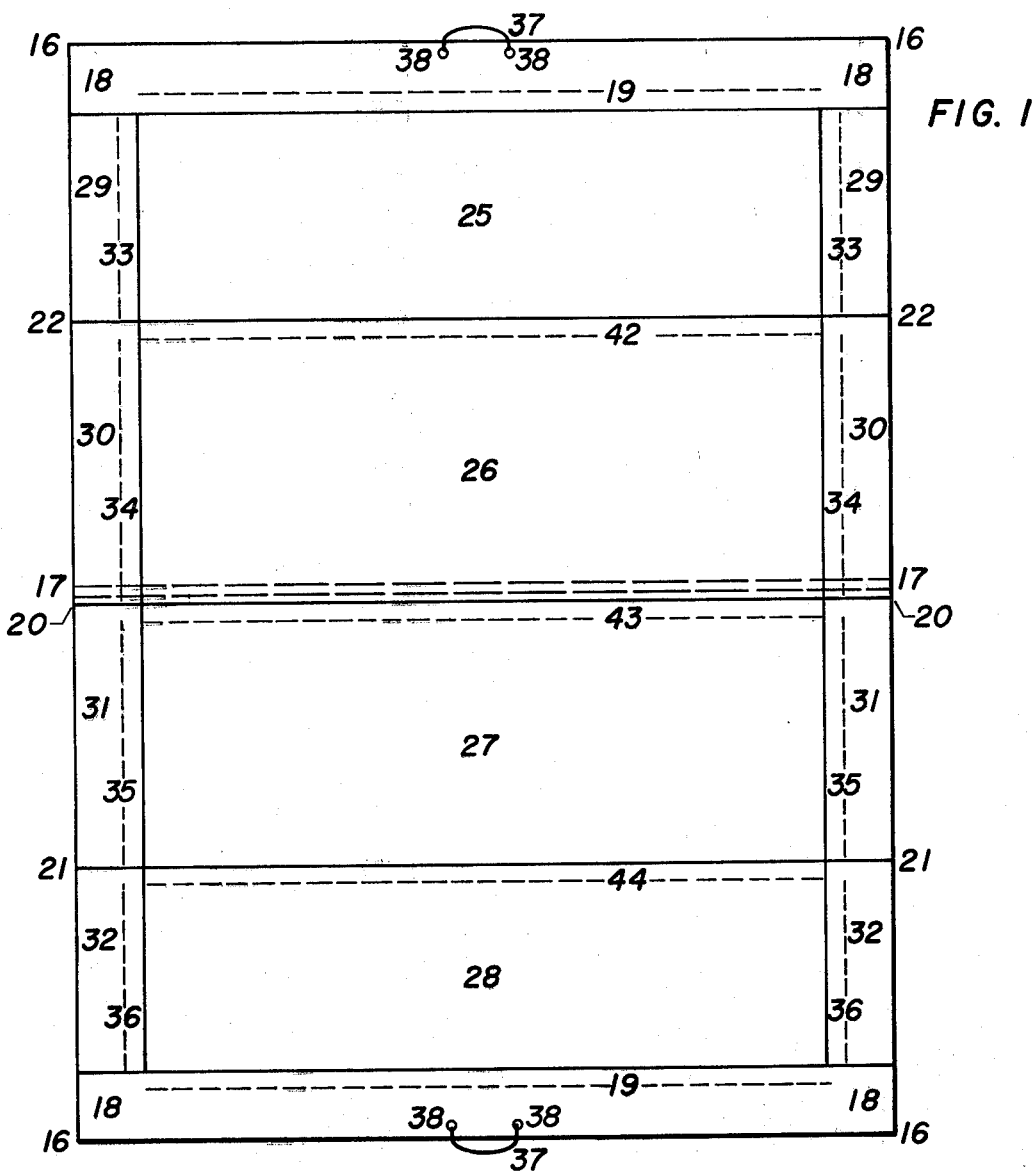

United States Patent [19]

Dickey

[11] 4,178,700

[45] Dec. 18, 1979

[54] BIBLE BOARD WITH BIBLE CUTOUTS

[75] Inventor: Avis M. Dickey, South Milford, Ind.

[73] Assignee: Dickey, Inc., South Milford, Ind.

[21] Appl. No.: 853,021

[22] Filed: Nov. 21, 1977

[51] Int. Cl.² ............................................. G09B 1/06
[52] U.S. Cl. .................................................. 35/23 R
[58] Field of Search ....................... 35/21, 23 R, 35 H

[56] References Cited

U.S. PATENT DOCUMENTS

| 3,077,677 | 2/1963 | Malkin et al. ........................ 35/35 H |
| 3,197,891 | 8/1965 | Pierce .............................. 35/35 H X |
| 3,952,423 | 4/1976 | Gentry ................................. 35/23 R |

OTHER PUBLICATIONS

Morehouse–Barlow Co. General Catalog, 1961, Title cover, pp. 18, 19, 23, 24.

*Primary Examiner*—William H. Grieb

[57] ABSTRACT

The present invention relates to a new and improved Tell Board wherein the length of the rectangular board is constructed to fold in half, the halves folding together to allow carrying handles at top and bottom to be one-handedly grasped. The face of the aforesaid board is enhanced with background design in keeping with subject matter for which the board is intended and is further made applicable with a plurality of interchangeable background designs which can be employed singly or for both halves simultaneously. The aforesaid board is further constructed with layering in manufacture to create slot pockets at top, bottom, center, and sides of each half, into which for securement of placement are inserted top, bottom, and/or side protrusions of minimally detailed, identically sided show pieces and differently sided background changes. A plurality of colors employed for the show pieces will distinguish one piece intended to portray a certain identity from its counterparts. The aforesaid show pieces are inserted at the discretion of the board user.

1 Claim, 15 Drawing Figures

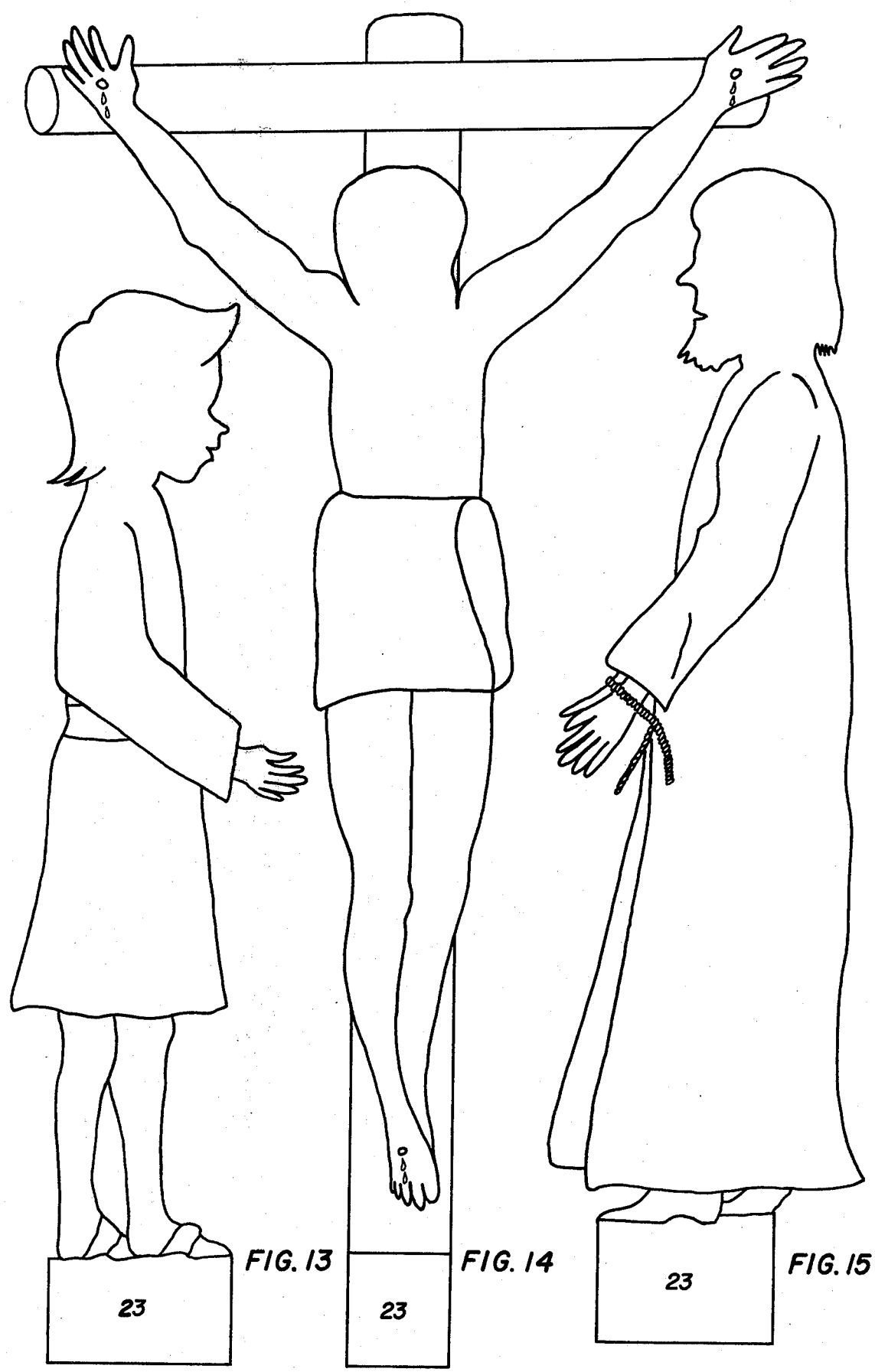

BIBLE BOARD WITH BIBLE CUTOUTS

It is the primary object of the invention to provide a simply and inexpensively manufactured board for visual display of facts, data, story points, rules, regulations, figures, etc., by the insertion of appropriate show pieces, the aforementioned show pieces from a set accompanying the board (i.e., Bible or story personages, etc.) or prepared by the user (i.e., sales figures, product quotas, etc.)

It is a second object of the invention to provide a go-anywhere, use-anywhere Tell Board which can be readily hung by its top carrying handle from any nail, screw, or projection spaced at desirable height.

It is a third object of the invention to provide suitable background changes for the basic board, the aforementioned changes readily applicable to bottom half, top half, or both top and bottom halves at the discretion of the user.

It is a fourth object of the invention to provide a storage place for the show pieces and background changes by the employment of an envelope on the board's upper reverse side.

Further objects and advantages of the invention will be had from the accompanying drawings wherein FIG. 1 is a planned view of the open Tell Board showing construction and relation of components.

Figure 2:
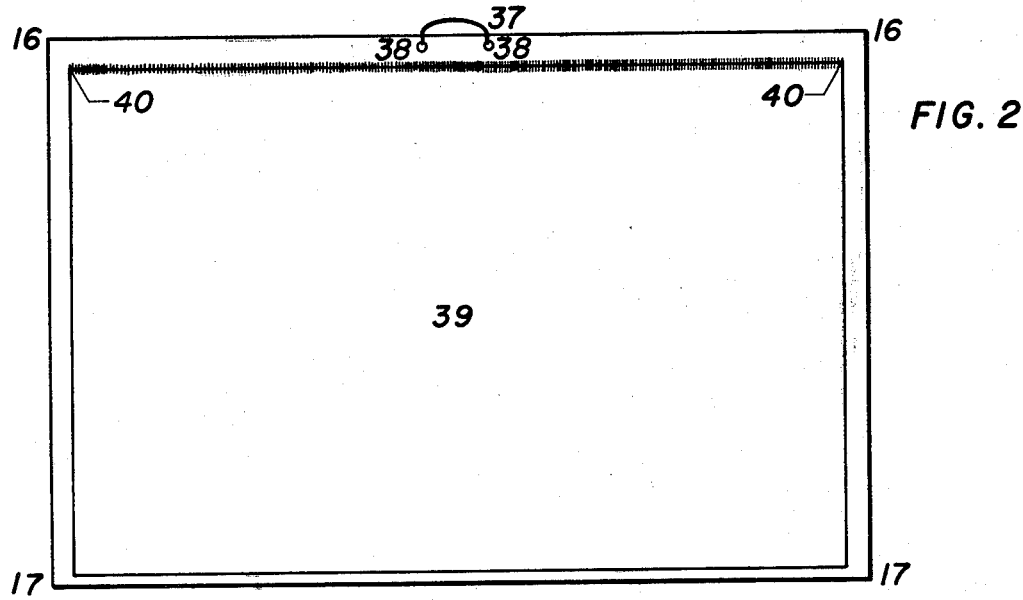
Figure 3:
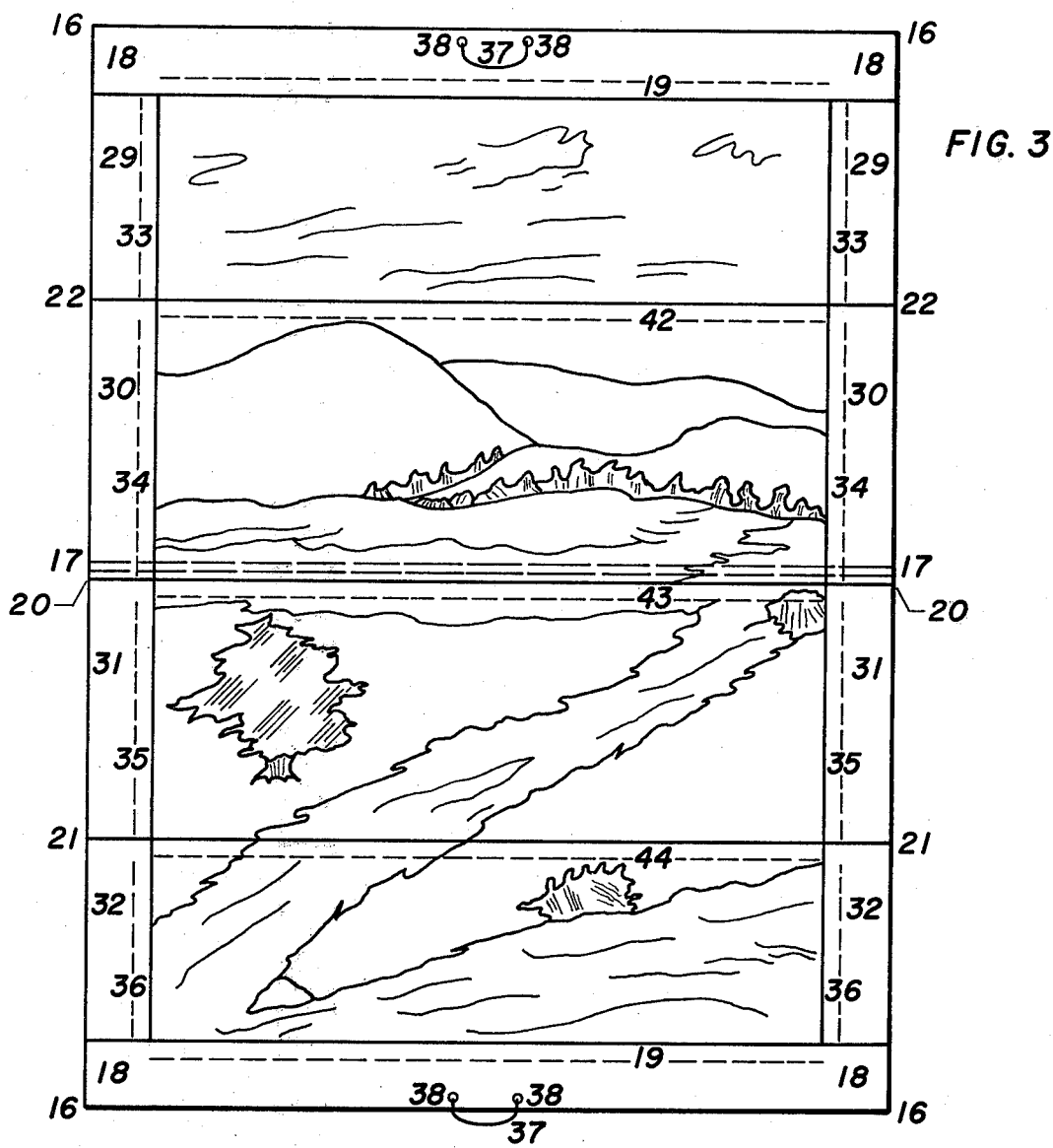

FIG. 2 is a planned view of the closed Tell Board showing reverse side envelope pocket with zip type closure, the aforesaid envelope pocket designed for storage and transportation of show pieces and background changes, while FIG. 3 depicts a completed open Tell Board, with appropriate face design.

Figure 4:
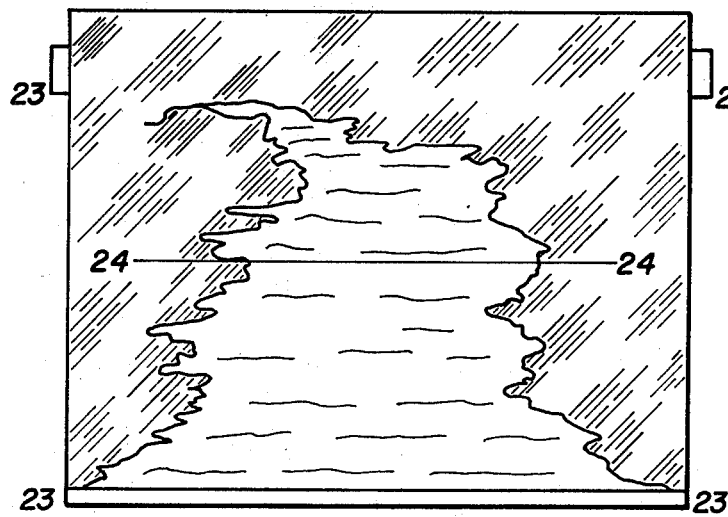
Figure 5:
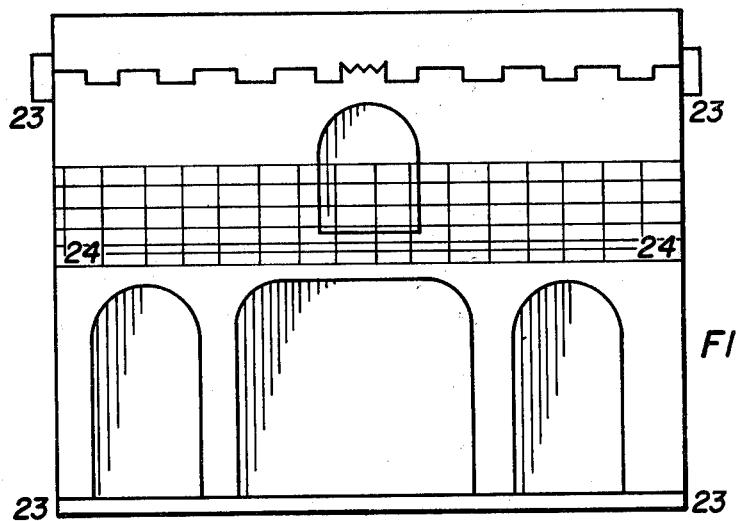
Figure 12:
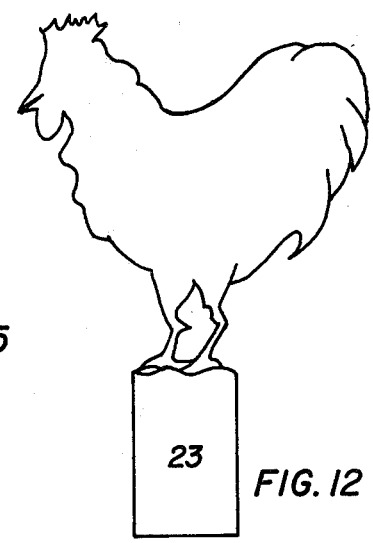
Figure 6:
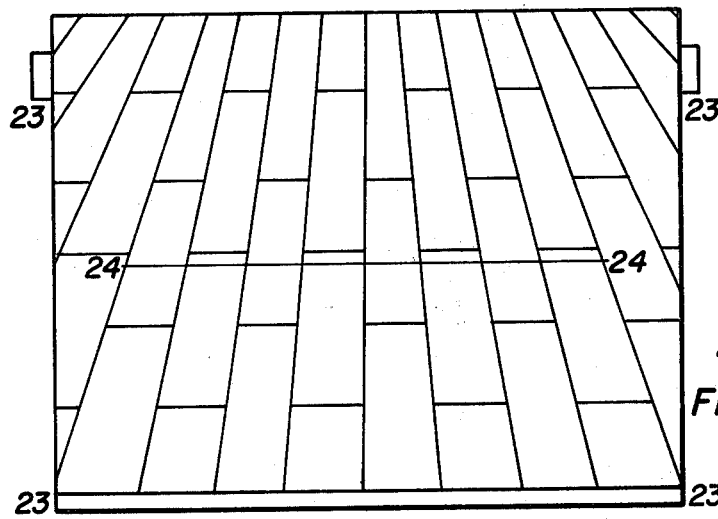
Figure 11:
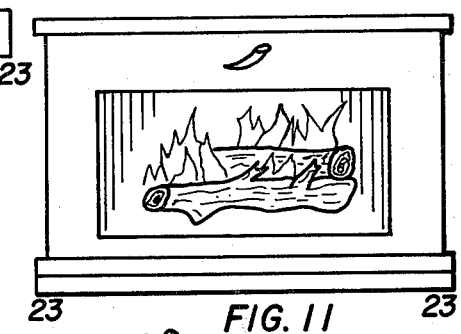
Figure 7:
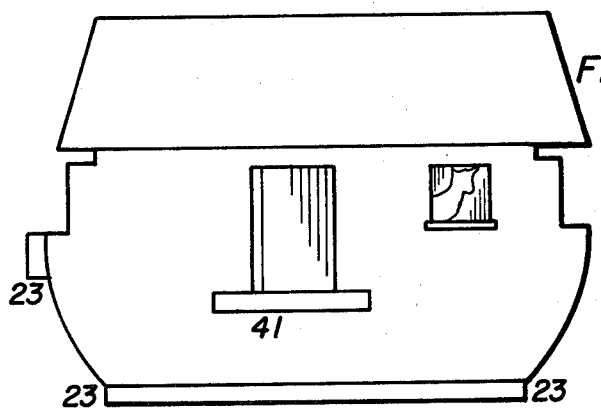
Figure 10:
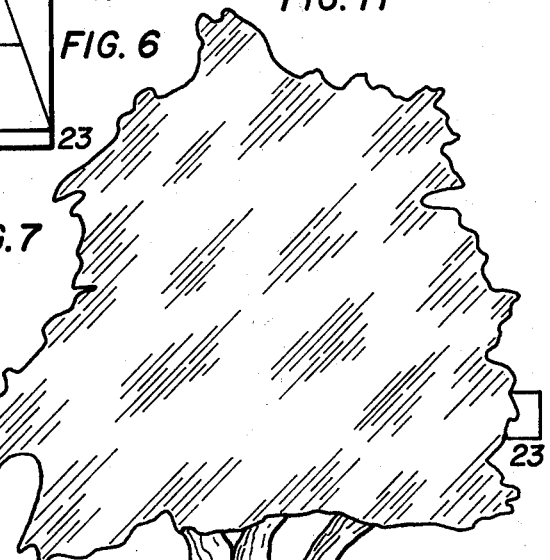
Figure 8:
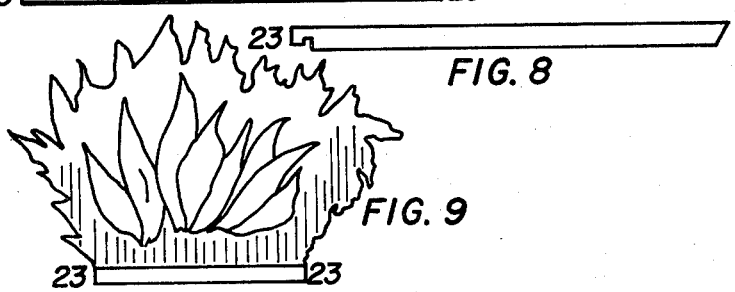
Figure 9:

FIGS. 4, 5, and 6 depict background changes with protrusions for securing insertion placement in the slot pockets of the Tell Board.

FIGS. 7, 8, 9, 10, and 11 depict a plurality of scale show pieces, while

FIGS. 12, 13, 14, and 15 depict typical show pieces of a size to accommodate a typically sized Tell Board, the aforesaid show pieces all designed with protrusions for slot pocket insertion.

PREFERRED EMBODIMENTS

Referring now more particularly to the drawings, FIG. 1 depicts the planned view of the components of an open Tell Board wherein a rectangle 16 of sturdy weight material, such as used in the corrugated packing box or other comparable material is employed as a base 16. Layered consecutively upon the base 16 are the following rectangles of base width and of 12-ply matting board or other comparable weight material:

First, a rectangle 25 which is one-fourth the length of the base 16 plus 1¼ inches is permanently affixed to the rectangular base 16, top edge to top edge.

Second, a rectangle 26 which is one-fourth the length of the base 16 plus 2½ inches is permanently affixed to the base 116 with 22 top 1¼ inches overlapping bottom edge of rectangle 25, the center portion of the overlap not affixed to within a measurement corresponding to the depth of the border pieces 18 (i.e., 2 inches or 3 inches) of the side edges, thereby forming pocket 42.

Third, a rectangle 27 which is one-fourth the length of the base rectangle 16 plus ¾ inch is permanently affixed to the base rectangle 16 with 20 top 1¼ inches overlapping bottom edge of rectangle 26, center portion of the overlap not affixed to within a measurement corresponding to the depth of the border pieces 18 of the side edges, thereby forming pocket 43.

Fourth, a rectangle 28 which is one-fourth the length of the base 16 plus 1¼ inches is permanently affixed to the base rectangle 16 with 21 top 1¼ inches overlapping bottom of rectangle 27, the center portion of the overlap not affixed to within a measurement corresponding to the depth of border pieces 18 of the side edges, thereby forming pocket 44.

The hereinbefore described manufacture gives visible dimension height to rectangle 25, of ¼ the length of the base 16; to rectangle 26, of ¼ the length of the base 16 plus ½ inch allowing for horizontal board centerfold; to rectangle 17, of ¼ the length of the base less ½ inch; to rectangle 28, of ¼ the length of the base 16, all the aforesaid rectangles being equal in width to the width of the base 16.

Border pieces 18 of identical material and width to rectangles 25, 26, 27, and 28 and of a suitable border depth (i.e., 2" or 3") are permanently affixed to the top of rectangle 25 and bottom of rectangle 28, with the inner 1¼-inch edge of each unaffixed to within a measurement corresponding to the depth of the border pieces 18 of the ends, thereby creating pockets 19.

Border pieces 29, 30, 31, and 32 of identical material and depth to the border pieces 18 and in length equal to the visible dimension height of rectangles 26 and 27 and to the visible dimension height less the depth of the border pieces 18 of rectangles 25 and 28 are permanently affixed to the side edges of each corresponding size rectangle, the inner 1¼-inch edge of each border piece 29, 30, 31, and 32 unaffixed to within a measurement corresponding to the depth of the border pieces 18 of each end, thereby forming pockets 33, 34, 35, and 36.

All hereinbefore mentioned pockets 19, 33, 34, 35, and 36 are formed over a strip of 6-ply Bristolboard or material of comparable weight identical to that from which show pieces of FIGS. 7, 8, 9, 10, 11, 12, 13, 14, and 15 and background changes of FIGS. 4, 5, and 6 are manufactured, thereby facilitating pocket insertion of the bottom, top, and side protrusions 23 of the aforementioned show pieces and background changes, the latter having an additional slit 24 coinciding with top edges of pockets 44 and 42 to accommodate protrusion 23 insertion.

The plurality of show pieces 12, 13, 14, and 15 are formed with minimal detail and with front and reverse sides identical, accommodating either side employment. Varied coloring creates a multiplicity of identity in like shaped pieces. The show pieces of FIG. 7 may be had with insertion pockets 41 providing additional insertion levels. The show pieces of FIGS. 7, 8, 9, 10, and 11 are likewise identically sided, but employ more detail of design. Background changes of FIGS. 4, 5, and 6 are had with one design on one side, a second on the reverse side to maximize set use with a minimum of change pieces.

FIG. 3 depicts a completed Tell Board, a typical Bible landscape design on its face. Horizontal pre-creasing 17 midway of the board length allows for board folding as in FIG. 2. Carrying handles 37 at board center top and bottom fastened through metal eyelets 38 are in adjacent position with folding for one-handed carrying.

FIG. 2 further depicts a simple envelope 39 of tough pliofilm (i.e., 4 or 6 mil.) or comparable material, in size reaching to within ½" of bottom and sides of folded board half and to within ½" of board tap eyelets 38, top of the aforementioned envelope 39 secured with zip type closure 40 and in close proximity to board top. The hereinbefore described envelope 39 provides storage for both background changes 4, 5, and 6 and show pieces 7, 8, 9, 10, 11, 12, 13, 14, and 15.

Tell Board, background changes, and show pieces are of vinyl-coated, plastic, or plasticized materials, thereby affording wipeable surface.

While the foregoing detailed description of my invention relates to a Biblically oriented set, it is understood the Tell Board with Show Pieces can be manufactured for employment in visually displaying any subject matter.

I claim as new and desire to secure by Letters Patent:

1. An appropriately decorated improved Tell Board with Show Pieces wherein to a firm rectangular backing with horizontal center fold is permanently affixed in layered sequence four rectangular panels of 12-ply matting board or comparable weight material, in width coextensive to the backing and in height equal to one-fourth the backing length plus one and one-fourth inches for panels one and four, plus two and one-half inches for panel two, and plus three/fourths inch for panel three, each top edge of panels two, three, and four overlapping the bottom edge of the previously affixed panel by 1¼ inches and unaffixed in the said 1¼ inch overlapping to within border depth of the panel sides, thereby creating slot pockets; pockets being additionally created by the permanent affixing of border pieces at top of panel one and bottom of panel four coextensive with panel width and having 1¼ inch inner edge unaffixed to within border depth of panel sides and by the permanent affixing of border pieces along each visible portion of panel side height between top and bottom borders, all side border pieces having 1¼ inch unaffixed inner edges to within 1¼ inches of the border piece ends; all created slot pockets, both vertical and horizontal providing for the discretionary insertion of top, side, and bottom protrusions of the accompanying minimally detailed, identically sided show pieces and their differently sided, additionally horizontally slit background changes, storage for which is provided in the zip-closing envelope affixed to the reverse upper half of the Tell Board, which board further employs simple eyelet-secured hanging/carrying handles at center top and bottom ends.

* * * * *